United States Patent
Ertekin

(10) Patent No.: US 6,397,354 B1
(45) Date of Patent: May 28, 2002

(54) METHOD AND APPARATUS FOR PROVIDING EXTERNAL ACCESS TO SIGNALS THAT ARE INTERNAL TO AN INTEGRATED CIRCUIT CHIP PACKAGE

(75) Inventor: Oguz Ertekin, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/276,957

(22) Filed: Mar. 26, 1999

(51) Int. Cl.[7] .................. G06F 11/00; G06F 11/273
(52) U.S. Cl. ................ 714/34; 714/37; 714/45
(58) Field of Search ............. 714/34, 38, 30, 714/40, 37, 45, 27, 39, 25, 733, 822; 713/400; 712/32, 39, 227; 710/300; 324/528; 439/55; 326/41, 101

(56) References Cited

U.S. PATENT DOCUMENTS

| | | | |
|---|---|---|---|
| 5,418,452 A | * | 5/1995 | Pyle |
| 5,541,935 A | * | 7/1996 | Waterson |
| 5,867,644 A |   | 2/1999 | Ranson et al. .......... 395/183.15 |
| 6,142,683 A | * | 11/2000 | Madduri |
| 6,189,140 B1 | * | 2/2001 | Madduri |

\* cited by examiner

*Primary Examiner*—Gopal C. Ray

(57) ABSTRACT

A method and structure facilitates the debugging and test coverage capabilities of an integrated circuit chip device under test (DUT), such as a microprocessor or a microprocessor system, while minimizing the number of observation pads of the DUT if so desired to observe-internal signals of the DUT. Internal signals of the DUT are easily observed and monitored by entry into a time-sampling mode in which N states of the DUT internal signals are successively sampled and held during N separate runs of a repeatable test to generate N partial traces that are temporarily stored. The N partial traces are driven out to one or more observation pads of the DUT and a complete trace of the signals is subsequently obtained by merging the N partial traces into a composite trace.

30 Claims, 7 Drawing Sheets

METHOD AND APPARATUS FOR PROVIDING EXTERNAL ACCESS TO SIGNALS THAT ARE INTERNAL TO AN INTEGRATED CIRCUIT CHIP PACKAGE

CROSS REFERENCES TO RELATED APPLICATIONS

The subject matter of the present application is related to U.S. Pat. No. 6,003,107, Ser. No. 08/707,936, titled "Circuitry for Providing External Access to Signals that are Internal to an Integrated Circuit Chip Package", filed Sep. 10, 1996 and issued Dec. 14, 1999, which is assigned to the assignee hereof and herein incorporated by reference.

FIELD OF THE INVENTION

This invention relates generally to testing of integrated circuit (IC) chip packages, and more particularly to a system and method for on-chip debug support and performance monitoring for IC chip testing, especially for microprocessors and microprocessor systems.

BACKGROUND

It has become very difficult to diagnose failures in and to measure the performance of IC chip packages, such as state-of-the-art microprocessors. This is because modern microprocessors not only run at very high clock speeds, but many of them also execute instructions in parallel, out of program order and speculatively. Moreover, visibility of the microprocessor's inner state has become increasingly limited due to the complexity of the microprocessors and to practical constraints on the number of external pads that can be provided on the chip package.

In the past, the traditional failure diagnosis and performance measurement tools have been external logic analyzers and in-circuit emulators. Logic analyzers are capable of monitoring signals on the chip pads and other externally-accessible system signals, capturing the state of these signals and generating triggers based on their states. Unfortunately, logic analyzers must rely solely on externally-accessible signals to accomplish this, not on signals that are internal to the chip itself. In-circuit emulators, on the other hand, are used to mimic the functional characteristics of a new microprocessor in a system environment and to add visibility to certain data values within the microprocessor. But such devices only emulate the functionality of the microprocessor. By their very nature, they cannot give an accurate representation of the performance characteristics of an actual silicon device. Therefore, they are primarily useful only for developing and debugging system software.

By way of background, U.S. Pat. No. 5,488,688, issued Jan. 30, 1996, to David R. Gonzales, et al., discloses a digital signal processor with a FIFO buffer configured on-chip to monitor a fixed set of internal bus signals. The FIFO buffer is coupled to a debug controller that is capable of operating in first and second modes. In the first mode, the CPU may be halted on the occurrence of one of four specifically-enumerated event conditions: after an external request; after a hardware breakpoint (occurrence of specific data or address values); after a software breakpoint (execution of a specific CPU instruction); or after a specified number of instructions have been executed. In the second mode, only the FIFO buffer is halted on the occurrence of an event condition. In either mode, the user may examine the contents of the FIFO buffer after a halt to determine what flow of software instructions were executed just prior to the event occurrence. An off-chip serial interface is used to communicate with the debug controller and to examine the contents of the FIFO buffer. The serial interface complies with the well-known Institute of Electrical and Electronics Engineers (IEEE) Standard 1149.1, "Test Access Port and Boundary Scan Architecture," also known as the Joint Test Action Group (JTAG) standard. A serial port conforming to this standard will hereinafter be referred to as a test access port or "TAP."

By way of further background, U.S. Pat. No. 5,473,754, issued Dec. 5, 1995 to Dale E. Folwell, et al., discloses a scheme for enabling an off-chip device to monitor the state of an on-chip 24-bit program counter in real time using an 8-bit port on the chip under test. Folwell assumes that discontinuities in the program counter will occur only in a limited number of situations. He then captures the contents of the program address bus only when one of these conditions occurs, and then sends those contents off chip via the 8-bit port. Because the contents of the program address bus are not captured with every increment of the counter, the volume of data that must be output via the 8-bit port is reduced.

By way of still further background, U.S. Pat. No. 5,317,711, issued May 31, 1994 to Philip A. Bourekas, et al., discloses a scheme for providing off-chip test access to the signals of an on-chip bus that connects an on-chip cache to an on-chip CPU. The signals of the bus are brought out to the chip's external address/data bus when the external address/data bus is not being used for transactions with main memory or peripherals. To accomplish this, reserved pins on the microprocessor are used to control a multiplexer. Depending on the state of the multiplexer's select lines, either the microprocessor's main memory read/write and data lines, or the address that is being provided to the internal cache memory, is coupled to the chip's external address/data bus.

By way of still further background, U.S. Pat. No. 4,910,417, issued Mar. 20, 1990 to Abbas El Gamal, et al., discloses an improved user-programmable interconnect architecture for logic arrays. Specifically, Gamal uses existing row-column selecting logic in combination with an output multiplexer for coupling user-selectable internal circuit nodes to a particular external chip pad for testing. Additionally, latches are provided for each chip input pin so that, with the assertion of an external signal, all chip inputs may be frozen. Then, the row-column select circuitry and output multiplexer may be used to probe nodes within the chip using the latched inputs as stimulus.

By way of further background, U.S. Pat. No. 5,418,452, issued May 23, 1995, to Norman C. Pyle, discloses an apparatus for testing integrated circuits using time division multiplexing. In order to reduce the number of pins necessary to communicate the signals from on-chip test nodes to an off-chip logic analyzer, Pyle employs a multiplexer on the chip under test and a demultiplexer in the logic analyzer. Each input of the multiplexer is coupled to an on-chip test node, and the multiplexer select lines are driven by counter outputs. By applying an identical set of counter outputs to the select lines of the demultiplexer, Pyle implements a time-division-multiplexed serial communication line between the chip under test and the logic analyzer. Signals from the numerous test nodes in the chip under test are coupled to the communication line in different time slices. The signals are then reconstructed by the demultiplexer in the logic analyzer.

While the above structures are useful for the particular purposes for which they are proposed, they fall far short of teaching or suggesting a comprehensive structure for debugging and monitoring the performance of a state-of-the-art microprocessor or microprocessor system. In particular, they fail to provide a means for observing internal chip signals in a high-speed microprocessor while keeping the debug observation pads to a minimum. As microprocessor clock frequencies increase, direct at-speed observability of internal signals become impractical due to the very high-speed input/output observation pads of the microprocessor, and sophisticated data capture and logic analysis instrumentation requirements.

U.S. Pat. No. 5,867,644, issued Feb. 2, 1999, to Hunt et al., for instance, keeps the debug observation pads to a minimum by implementing on-chip multiplexers which are programmed through remote diagnose registers in order to statically multiplex groups of signals out to the observation pads. Signals that are in different sampling groups are then captured by reprogramming the multiplex select lines and rerunning the case. This approach provides significant reduction in the number of required observation pads and requires that the data capture instruments used, such as logic analyzers, run at the same speed as the device under test (DUT). It also assumes that the test case is repeatable across multiple runs.

What is needed in the art is a comprehensive system and method for enabling microprocessor and microprocessor system designers to debug state-of-the-art microprocessors and systems more easily, and to do so in a highly flexible and sophisticated manner. Such a system and method should enable tests to be performed using the actual hardware of the device being evaluated, under actual system environment conditions, and while running the device at full speed. Such a system and method should provide for the observation of internal chip signals in a high-speed microprocessor while minimizing the number of debug observation pads of the microprocessor chip that are required.

SUMMARY OF THE INVENTION

Therefore, according to the present invention, a method and system facilitates the debugging and test coverage capabilities of a IC device under test (DUT), such as a microprocessor or a system containing such a microprocessor.

A method and system for observing internal signals of a DUT, such as a high-speed microprocessor or other applicable IC chip package, while keeping the debug observation pads of the DUT to a minimum through time sampling of signals at the observation pad drivers of the DUT is described. The present invention addresses the need to observe internal signals, sometimes referred to as debug signals, of the DUT by allowing entry into a time-sampling mode in which N states of the internal signals are successively sampled and held during N separate runs of a repeatable test to generate N partial traces that are temporarily stored. The N partial traces are driven out to the observation pads of the DUT and a complete trace of the signals is subsequently obtained by merging the N partial traces into a composite trace. This approach of the present invention allows the device under test (DUT) to run at speeds that are N times the frequency capabilities of the pad drivers of the DUT and the instrumentation, such as logic analyzers, that are typically used to provide debug support and performance monitoring of the DUT.

The present invention is particularly useful in applications in which there is a significant speed disparity between the DUT and the measuring instruments used to analyze the internal signals of the DUT. Microprocessor technology, for example, is characterized by high-speed microprocessors with ever-increasing frequencies. As microprocessor clock frequencies increase, direct at-speed observation of the microprocessor's internal signals become impractical due to the corresponding requirements for very high-speed input/output observation pads and data capture and measurement instrumentation. The present invention allows for the observation and analysis of internal signals of a high-speed microprocessor operating at N-times the frequency of the observation pad drivers of the microprocessor and the measurement instrumentation by entry into the time-sampling mode. When the DUT runs at sufficiently slow speeds, the time-sampling mode of the present invention need not be used.

BRIEF DESCRIPTION OF THE DRAWINGS

The present invention is described herein with reference to the accompanying drawings, like reference numbers being used therein to indicate identical or functionally similar elements.

DETAILED DESCRIPTION OF THE INVENTION

The present invention provides for the observation of internal signals of a DUT in a manner that minimizes the number of chip observation pads that are required for observation. Internal signals of the DUT are easily observed and monitored by entry into a time-sampling mode in which N states of the DUT internal signals are successively sampled and held during N separate runs of a repeatable test to generate N partial traces that are temporarily stored. The N partial traces are driven out to the observation pads of the DUT and a complete trace of the signals is subsequently obtained by merging the N partial traces into a composite trace.

Figure 1:
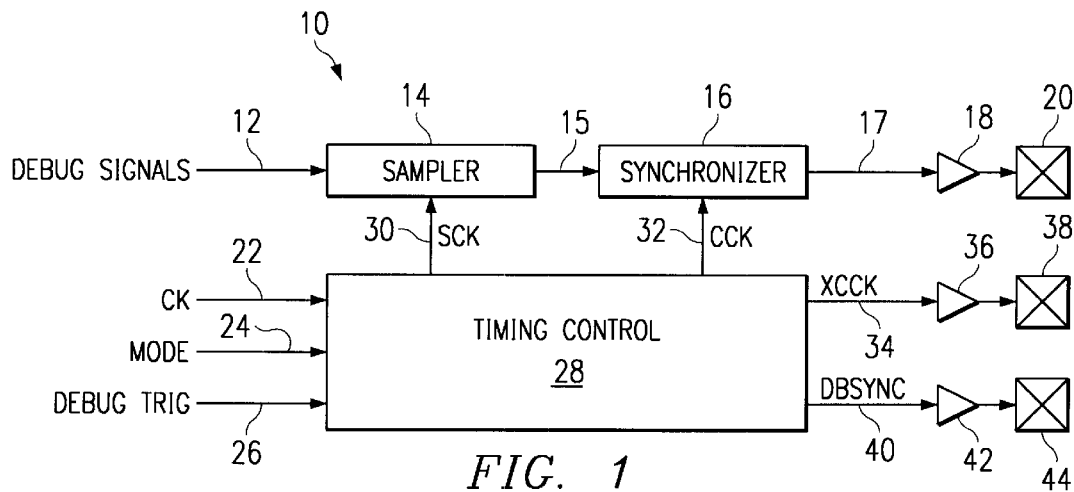
FIG. 1 illustrates DUT circuitry suitable for observation of DUT internal signals, according to the present invention.

Referring now to FIG. 1, DUT circuitry 10 for observation of DUT internal signals according to the present invention is shown. DUT circuitry 10 includes sampler block 14, synchronizer block 16, timing control block 28, pad drivers 18, 36,42, and DUT pads 20, 38,44. DUT circuitry 10 has a data path defined by sampler block 14, synchronizer block 16, pad driver 18, and pad 20 and a control path defined by timing control block 28, pad drivers 36, 42, and pads 38, 44.

DUT Internal signals 12 to be monitored are provided to sampler block 14 of circuitry 10 and clock signal 22, Mode signal 24, and Debug Trig signal 26 are provided to timing control block 28. Timing control block 28 generates sample clock SCK to control the timing of sampling of internal signals 12 by sampler block 14 and capture clock CCK to control capture of sampled signals 15 by synchronizer block 16. Timing control block 28 also generates external capture clock XCCK and synchronization signals DBSYNC that are provided to pad drivers 36, 42 and, ultimately, to pads 38, 44, respectively. As will be described below, XCCK 34 is used by the external measurement instrumentation to know when to capture data provided to it. DBSYNC is a synchronization signal also provided to the external measurement instrumentation to avoid ambiguity as to when a realigned trace begins as a result of Debug Trig signal 26 firing by marking the beginning of a new synchronized trace. DBSYNC is therefore used as a reference in merging multiple partial traces into one composite trace.

The time sampling methodology of the present invention requires precise control of the relationship of sampled states to a programmable internal event of the DUT. The sampling of N successive states over N repeatable tests therefore occurs with respect to a trigger signal, Debug Trig 26, that can be programmed to fire in the event of a programmable internal event of the DUT and the firing of Debug Trig 26 will therefore ordinarily determine the beginning of a sample trace. For instance, Debug Trig 26 may be a signal generated by the DUT itself by wire-ORing Debug Trig signals generated by multiple central processor units (CPUs) of a microprocessor. Alternately, Debug Trig 26 may be asserted by the external measurement instrumentation in response to the occurrence of a programmable internal event of the DUT that is detected by the external measurement instrumentation as a result of monitoring the internal signals of the DUT.

Figure 2:
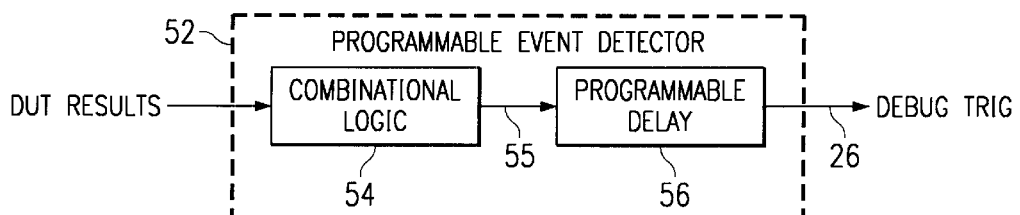
FIG. 2 is a block diagram that illustrates the generation of a Debug Trig signal, according to the present invention.

Regardless of whether Debug Trig signal 26 is generated internally or externally to the DUT, FIG. 2 illustrates the manner in which Debug Trig signal 26 is generated. On-chip results 50 are DUT signals that are the result of the occurrence of a programmable internal DUT event such as the occurrence of a certain instruction, for instance, and are provided to event detector block 52. Event detector block 52 contains combinational logic 54 that monitors on-chip results 50 and generates a trigger signal 55 when the occurrence of a programmable internal event is detected. Event detector block 52 optionally includes a programmable delay element 56 that adds a programmable delay to trigger signal 56 to generate Debug Trig signal 26 if so desired. Optional programmable delay element 56 can be used to provide programmable delay between the occurrence of the internal event of the DUT and the firing of Debug Trig 26. This may occur by providing a programmable delay between the internal event and Debug Trig 26, as in waiting a certain number of states of core clock 22 after the occurrence of the internal event before Debug Trig 26 fires. Or, the programmable delay may be inserted after Debug Trig 26 fires a fixed period of time after occurrence of the internal event.

Figure 3:
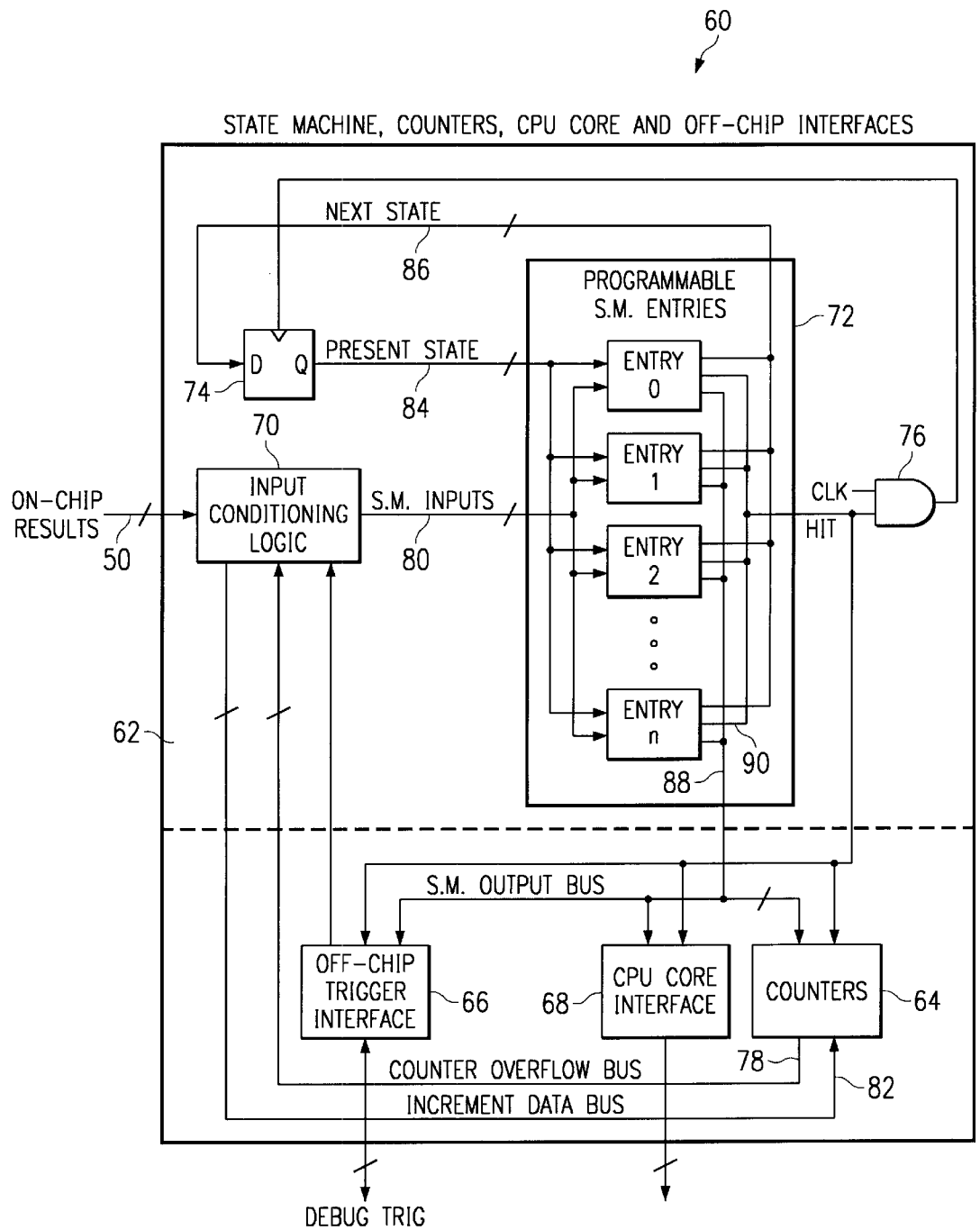
FIG. 3 is a block diagram of a microprocessor that illustrates generation of a Debug Trig signal, according to the present invention.

Consider the case in which Debug Trig signal 26 is an internal trigger signal of the DUT that is programmed to fire in the event of a programmable internal event of the DUT. U.S. Pat. No. 5,867,644, issued Feb. 2, 1999, to Hunt et al., for instance, provides a description of a Debug Trig generated by a microprocessor in response to the occurrence of a programmable internal event of the microprocessor. Referring now to FIG. 3, block 60 illustrates how Debug Trig could be generated according to the disclosure of U.S Pat. No. 5,867,644; FIG. 3 is for illustrative purposes and one skilled in the art will recognize that Debug Trig signal 26 may be generated any number of ways. Block 60 of the microprocessor contains programmable state machine 62, counters 64, off-chip trigger interface 66, and CPU core interface 68. Programmable state machine 62 includes input conditioning logic 70, programmable state machine entries 72, multi-bit present state latch 74 and AND gate 76. The inputs to input conditioning logic 70 include on-chip results 50, bits from counters 64 (via counter overflow bus 78), and one bit from off-chip trigger interface 66. Input conditioning logic provides output bits to programmable state machine entries 72 as state machine inputs 80 and to counters 64 via increment data bus 82. As can be seen in the drawing, the inputs of each of programmable state machine entries 0–n are coupled to multi-state latch 74 by state bus 84 and also to state machine inputs 80. The outputs of each of programmable state machine entries 0–n are coupled to next state bus 86, state machine output bus 88, and HIT bus 90. The HIT signal is combined with CLK by AND gate 76 to derive a signal that is used to control multi-state latch 74 as shown. Debug Trig signal 26 is generated by off-chip trigger interface 66, as shown.

Figure 4:
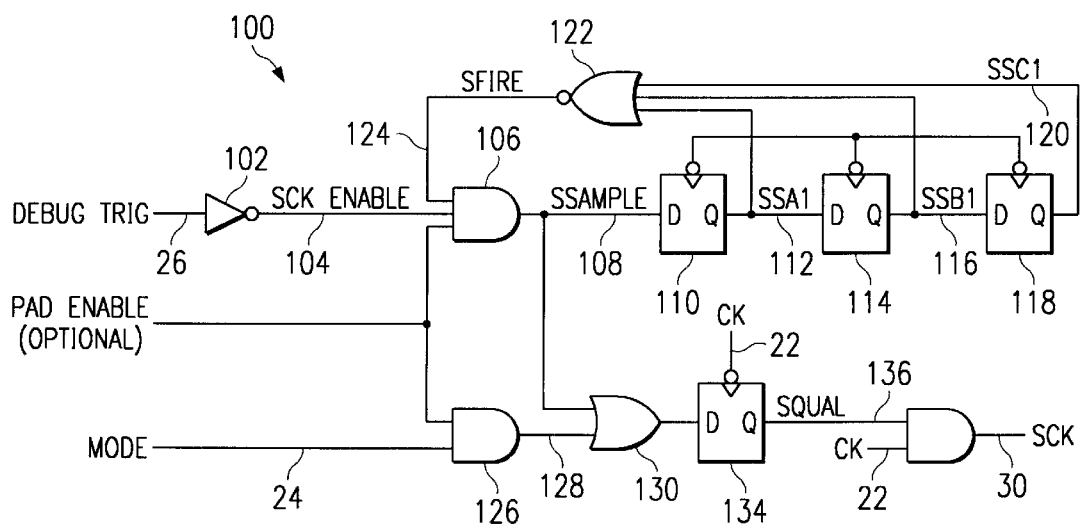
FIG. 4 is a schematic diagram of sample clock generation circuitry, according to the present invention.

As indicated in FIG. 1, sample clock SCK 30, capture clock CCK 32, external capture clock XCCK 34, and DBSYN signal 40 are generated by timing control block 28 which is provided the following input signals: core clock CK signal 22, Mode signal 24, and Debug Trig signal 26. The generation of these signals will be demonstrated in FIGS. 4–7. It is noted that the circuitry in these figures is illustrative of N=4 states of a N-state window. Referring now to FIG. 4, sample clock generation circuitry 100 is shown. Circuitry 100 has several elements, including: inverter element 102, AND logic gates 106,126,138, delay elements 110, 114, 118, 134 (shown as flip-flops), NOR logic gate 122, and OR logic gate 130. Circuitry 100 is provided with Debug Trig signal 26, Pad Enable signal 103, Mode signal 24, clock CK signal 22, and generates sample clock SCK signal 30.

AND logic gate 106 receives sfire signal 124, sck enable signal 104, and optional pad enable signal 103 as input signals and generates ssample signal 108. Ssample signal 108 is provided to the D input of flip-flop delay element 110 which generates ssa1 signal 112 when clocked by CK core clock 22. Ssa1 signal 112 is a first input signal to NOR logic gate 122 and the D input signal to flip-flop delay element 114. Delay element 114 is clocked by CK core clock 22 and generates ssb1 signal 116, the second input signal to NOR logic gate 122 and the D input signal to flip-flop delay element 118. Element 118 in turn generates ssc1 signal 120, the third input signal or NOR logic gate 122.

AND logic gate 126 is provided Mode signal 24 and optional pad enable signal 103 as input signals and generates signal 128, a first input signal to OR logic gate 130. OR logic gate 130 is additionally provided with ssample signal 108 and generates ssample 1 signal 132. Flip-flop delay element 134 is clocked by CK core clock 22 to generate SQUAL signal 136. SQUAL signal 136 and CK signal 22 are gated at AND logic gate 138 to generate SCK sample clock, the output signal of circuitry 100. It is noted that pad enable signal 103 is an optional signal that is used to enable pad 20.

If pad enable signal 103 is not utilized, the need for AND logic gate 126, and thus signal 128, is eliminated and Mode signal 24 is provided directly to OR logic gate 130.

Circuitry 100 normally generates SCK clock 30 every cycle of core clock CK 22 in the normal mode and while in the normal mode, the logic level of Debug Trig signal 26 does not affect the generation of SCK clock 30 every cycle. Mode signal 24 and Debug Trig signal 26 determine when this generation of SCK clock in the normal mode is interrupted and SCK clock 30 can be subsequently generated in the time-sampling mode. After Mode signal 24 is asserted, as a low logic level (0) for the circuitry of the drawings, the time sampling of the present invention may be accomplished upon the subsequent firing and de-assertion of Debug Trig signal 26. When in the time-sampling mode and Debug Trig signal 26 fires, transitioning from a low (0) to a high (1) logic level in response to the occurrence of a programmable internal event, circuitry 100 stops generating SCK signal 30; Debug Trig signal 26 remains a high logic level for at least N−1 states. When Debug Trig signal 26 subsequently de-asserts itself by transitioning back to the low logic level, generation of SCK signal 30 by circuitry 100 resumes on the falling edge of Debug Trig signal 26 as gated by core clock signal 22. Generation of SCK signal 30 in the time-sampling mode (with Mode signal 24 asserted) after firing and subsequent de-assertion of Debug Trig signal 26, however, occurs once every four states of core clock 22 to enable time sampling of internal signals 12 by sampler block 14. The generation of sample clock SCK signal 30 every 4 states is ensured by delay elements 110, 114, and 118, shown here as flip-flop elements. This is because sfire signal 124 is controlled by the input signals ssa1 signal 112, ssb1 signal 116, and ssc1 signal 120 to NOR logic gate 122 to fire at a high logic level only once every four states, thereby causing ssample signal 108 to go high only once every four states. This, in turn, permits SCK sample clock 30 to be generated only once every four states.

Generation of SCK clock 30 every four CK clock cycles 22 continues in this manner until either Debug Trig signal 26 fires again or Mode signal 24 is de-asserted characteristic of the normal mode of operation of circuitry 100. In this first instance, if Debug Trig signal 26 fires again and Mode signal 24 is still asserted then generation of SCK clock 30 by circuitry 100 halts until Debug Trig signal 26 de-asserts to the low logic level. Upon the de-assertion of Debug Trig signal 26 generation of SCK clock signal 30 every four states resumes until such time as Debug Trig signal 26 again fires and de-asserts or until Mode signal 24 is no longer asserted. In the second instance, de-assertion of Mode signal 24 from the time-sampling mode to the normal operation mode will cause SCK to be generated every cycle of core clock CK signal 22 in the normal mode. It is recognized, however, that the mode of the circuitry typically will not be changed.

The multiple sample clock SCK signals 30 generated every 4 states of core clock CK signal 22 by circuitry 100 while in the time-sampling mode are used by sample block 14 of FIG. 1 to take samples of successive states of DUT debug signals 12 during separate runs of a repeatable test. It is hereby noted that prior to the repeatable test being re-run, Debug Trig signal 26 must be programmed to fire at a different state than it fired during the previous run in order to capture all of the desired states of the signals during subsequent test runs. Usually Debug Trig signal 26 would be reprogrammed to fire a state later than it fired during the previous run of the repeatable test in order to be able to capture a successive set of signals during subsequent runs of the test, although the firing of Debug Trig signal 26 need not be reprogrammed to fire in a sequential, chronological manner so long as all states within the N-state window are captured during the N runs of the repeatable test.

Figure 5:
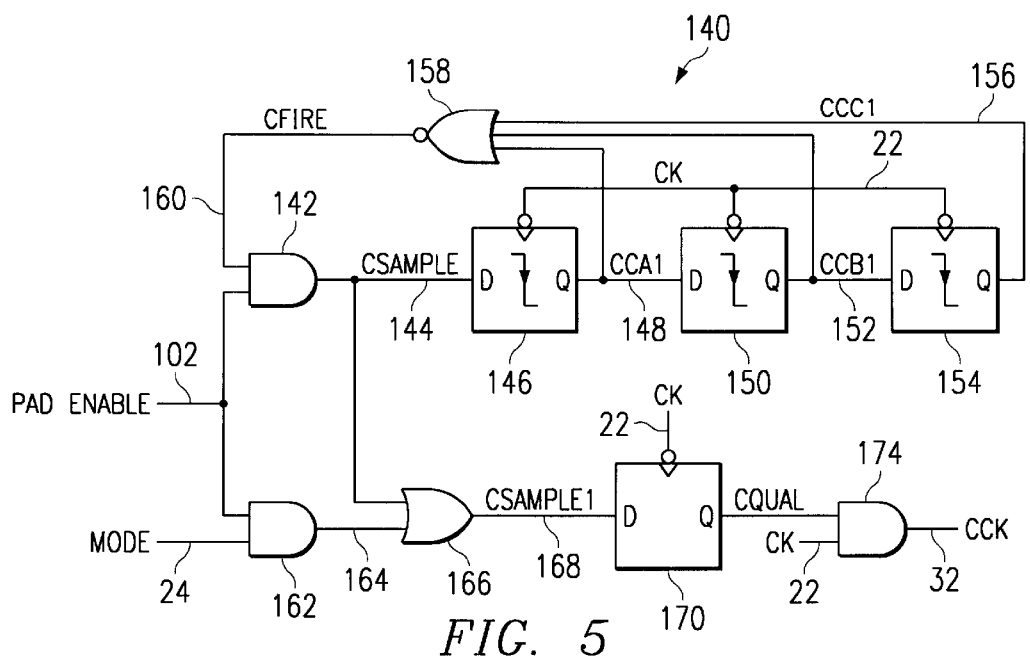
FIG. 5 is a schematic diagram of capture clock generation circuitry, according to the present invention.

In addition to providing sample clock SCK signal 30, timing control block 28 of FIG. 1 also generates capture clock CCK signal 32, external capture clock XCCK signal 34 and DBSYNC signal 40. Referring now to FIG. 5, capture clock generation circuitry 160 is illustrated. Circuitry 160 has several elements, including: AND logic gates 142,162, 174, NOR logic gate 142, OR logic gate 166, and delay elements, shown is flip-flops, 146, 150, 154, 170. Circuitry 160 is similar in operation to circuitry 100 of FIG. 4 except that it is not dependent upon a Debut Trig 26 input signal to generate capture clocks CCK 32; indeed, only mode signal 24, core clock CK signal 22, and pad enable signal 102 are input signals to circuitry 140. Again, as with FIG. 4, pad enable signal 102 is an optional signal. If pad enable signal 102 is not utilized, then AND logic gates 142,162 would not be needed.

The fact that capture clock generation circuitry 140 does not require debug trig signal 26 as an input signal is a significant distinction of FIG. 5 from FIG. 4. Capture clock generation circuitry 140 of FIG. 5 generates capture clock 32 as a free running clock that is not affected by the occurrence of events internal to the DUT. Once circuitry 140 is enabled by mode signal 24 being asserted (0), than capture clock CCK 32 is generated according to the delays inherent in circuitry 140.

The above description describes sample clock SCK signal 30 as a reference that indicates when sampling of internal signals 12 of the DUT by sampler block 14 is to occur as a function of the firing of Debug Trig 26. Capture clock CCK signal 32 is the reference used by synchronizer block 16 to know when to capture and hold the partial traces 15 generated by sampler block 14. SCK 30 and CCK 32 have the same frequency but because SCK 30 is tied to Debug Trig 26 while CCK is a free-running clock tied to core clock CK 22 that does not change, the phase relationship between SCK 30 and CCK 32 is subject to change as the generation of SCK 30 is influenced by the firing and subsequent de-assertion of Debug Trig signal 26.

As previously indicated, timing control block 28 of FIG. 1 additionally generates external capture clock XCCK signal 34. In addition to the partial traces that are driven out to the observation pad 20 of the DUT, XCCK signal 34 is driven out to DUT pad 38 and is used by the external measurement instrumentation to know when to capture data provided to pad 20. A consideration that must be taken into account is that external measurement instrumentation often use internal phase lock loop (PLL) technology to lock onto the XCCK reference clock and thus XCCK reference clock signal 34 must be a free-running clock within certain tolerances acceptable to the external measurement instrumentation. It is therefore important that realignment of the internal sample clock SCK 30 be accomplished without affecting XCCK reference clock 34. It is further noted that the synchronization provided by synchronizer block 16, and thus CCK clock 32, are not required for the-operation of the invention, especially in those cases in which the external measurement instrumentation is capable of handling discontinuities of its reference clock. If synchronization block 16 is not to be used, XCCK clock 34 could be derived from SCK 30, rather than from CCK 32.

Figure 6:
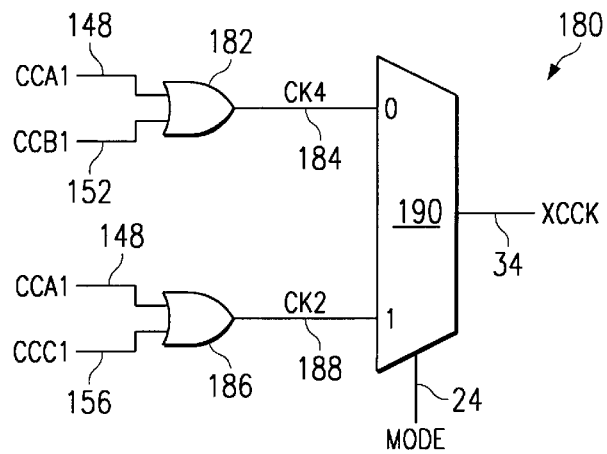
FIG. 6 is a schematic diagram of circuitry for generation of an external capture clock, according to the present invention.

Referring now to FIG. 6, circuitry 180 for generating XCCK signal 34 is illustrated. The delayed signals cca1 signal 148, ccb1 signal 152, and ccc1 signal 156 are used in FIG. 6 to generate clock CK4 signal 184 and clock signal CK2 signal 188. CK4 clock signal 184 is a divide-by-four clock, assuming N=4 states, that allows internal signals 12 to be captured once every state. CK2 clock signal 188 is a divide-by-two clock that allows internal signals 12 to be captured on both the rising and falling edges. Signals 184 and 188 are presented to multiplexer element 190 which is controlled by mode signal 24 to selectively pass signals 184 or 188 as XCCK signal 34. When mode signal 24 is asserted at an active low logic state, the time-sampling mode is active and thus CK4 signal 184, indicative of time-sampling mode operation, is passed by multiplexer 190; conversely, when mode signal 24 is non-active (1 logic level), indicative of a normal mode of operation, then CK2 signal 188 is passed by multiplexer 190.

Figure 7:
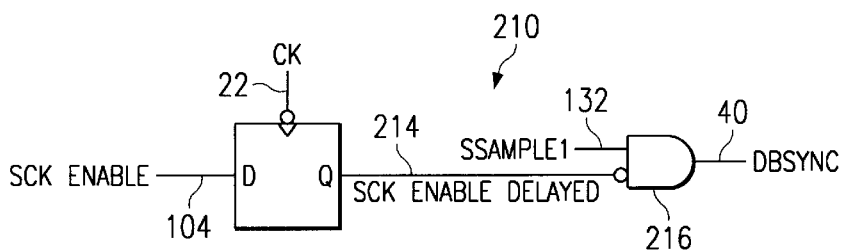
FIG. 7 is a schematic diagram of circuitry for generation of a synchronization control signal DBSYNC, according to the present invention.

Related to the generation of sample clocks SCK 30 is the generation of DBSYNC signal 40, shown in FIG. 7. As a consequence of having two clock domains, reflected in the generation of SCK and CCK clocks 30 and 32, respectively, an ambiguity might arise as to when a realigned trace begins as a result of Debug Trig signal 26 firing to a high logic level and then returning to a low logic level (de-asserting). Any ambiguity, however, is avoided by generating an additional sync signal, called DBSYNC, that fires once when Debug Trigger causes a realignment of the internal sample clock SCK by firing and then returning to the low logic level, thereby marking the beginning of the "valid" trace. The DBSYNC signal, which is also capable of being itself captured by the external measurement instrumentation, is used as a reference to merge the multiple partial traces into the composite trace.

Referring now to FIG. 7, circuitry 210 for the generation of DBSYNC signal 40 is illustrated. Delay element 212 introduces a delay to SCK enable signal 104 when clocked by a core clock CK 22 to generate SCK enable delayed signal 214. Signal 214 is inverted and gated with ssample 1 signal 132 by AND logic gate 216 to produce DBSYNC signal 40. SCK enable signal 104 is derived from debug trig signal 26 and, together with the complement. of sck enable delay signal 214, sample 1 signal 132 represents the first valid sample after Debug Trig signal 26 fires, as illustrated in FIG. 4. Thus the gating of signals 214 and 132 by logic gate 216 ensures that DBSYNC signal 40 fires only upon the first valid sample after debug trig signal 26 de-asserts after firing by transitioning from a high (1) to a low (0) logic level. One skilled in the art will recognize that various structures for generating DBSYNC signal 40 according to similar functionality may be employed. For instance, if Debug Trig signal 26 were the input signal to delay element 212 then the output signal 214 would not need to be inverted prior to being an input signal to AND logic gate 216.

Figure 8:
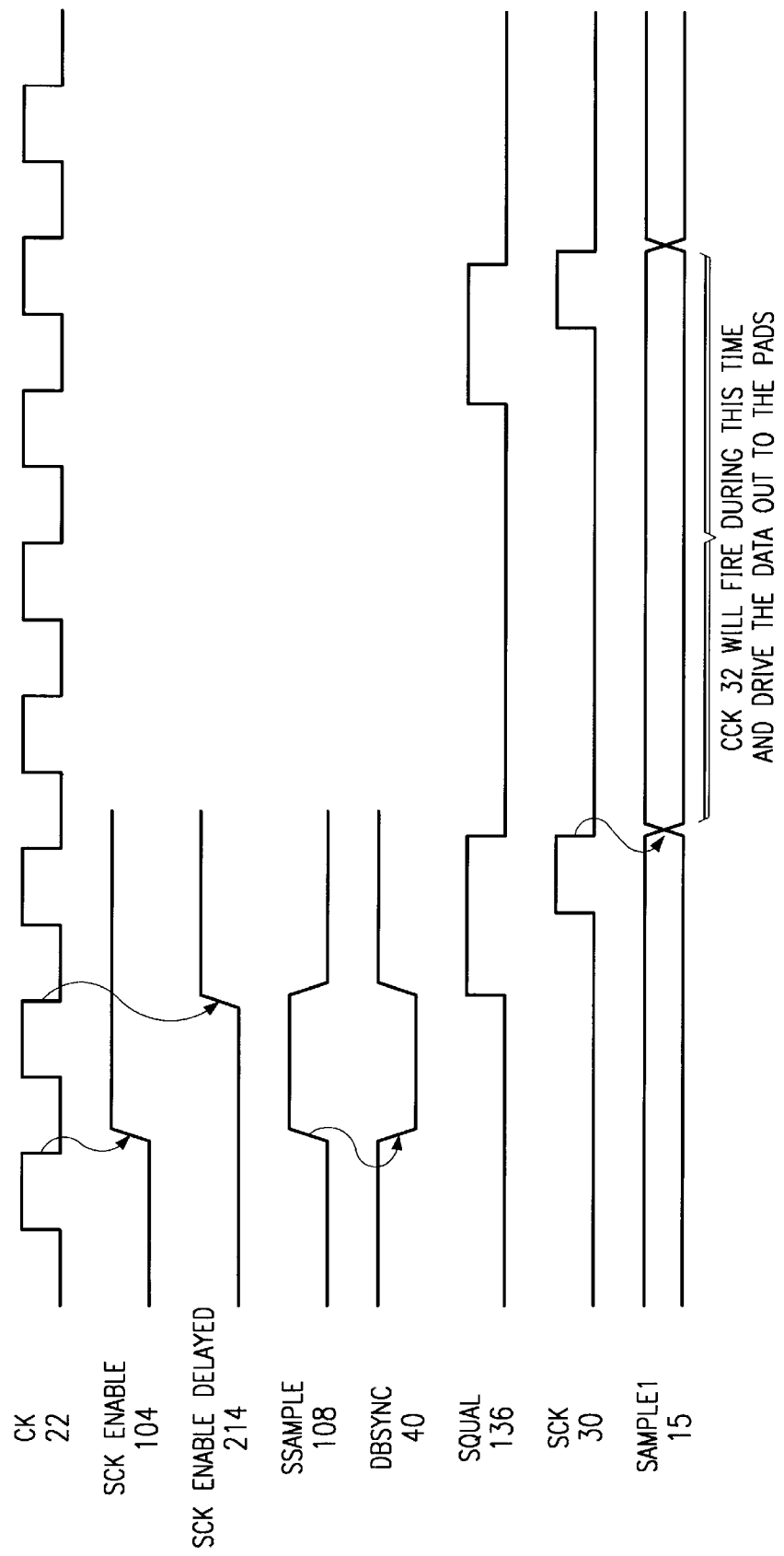
FIGS. 8 and 9 are timing diagrams that illustrate the time sampling of the present invention.

The timing diagram of FIG. 8 illustrates the time sampling of the present invention. It can be seen that the timing is based upon the falling edge transition of core clock CK 22 and Debug Trig 26 (SCK enable 104 is Debug Trig 26 inverted). It can be seen that sample clock SCK 30, generated by gating SQUAL 136 and CK 22 as shown in FIG. 4, remains low for exactly N–1 states once generated. This allows capture clock CCK 32 to fire somewhere during sample 1 signal 15 being active as shown, since the exact timing of CCK 32 is independent of SCK and thus may not necessarily be known.

Figure 9:
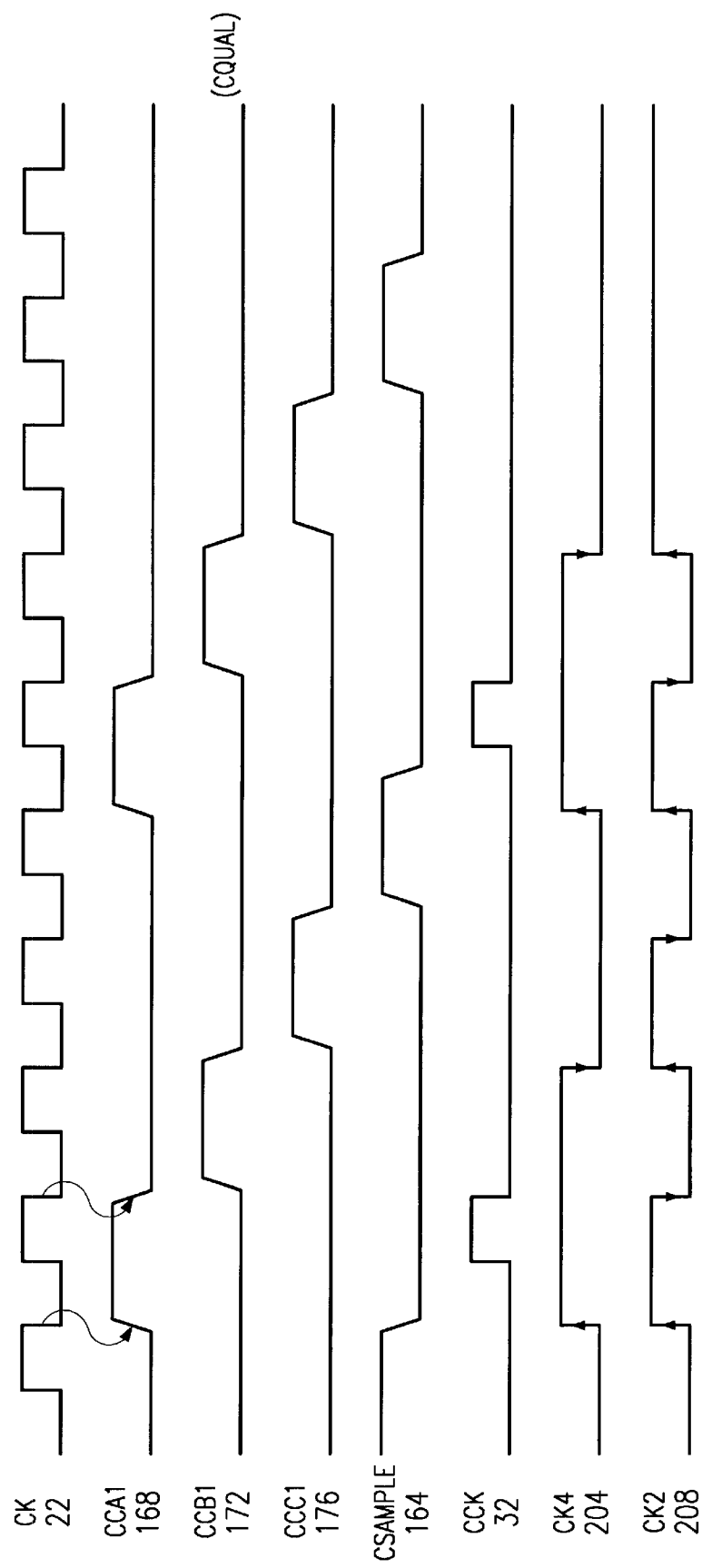

The timing diagram of FIG. 9 illustrates the timing of signals of FIGS. 5 and 6. It can be seen how delayed capture sample signals cca1 signal 148, ccb1 signal 152, and ccc1 signal 156 are delayed in time with respect to core clock CK signal 22 and how csample signal 164 is triggered by cca1 signal 168. The CK4 and CK2 clock signals 184,188 are generated by gating cca1 signal 148, ccb1 signal 152, and ccc1 signal 156 as shown in FIG. 6.

Figure 10:
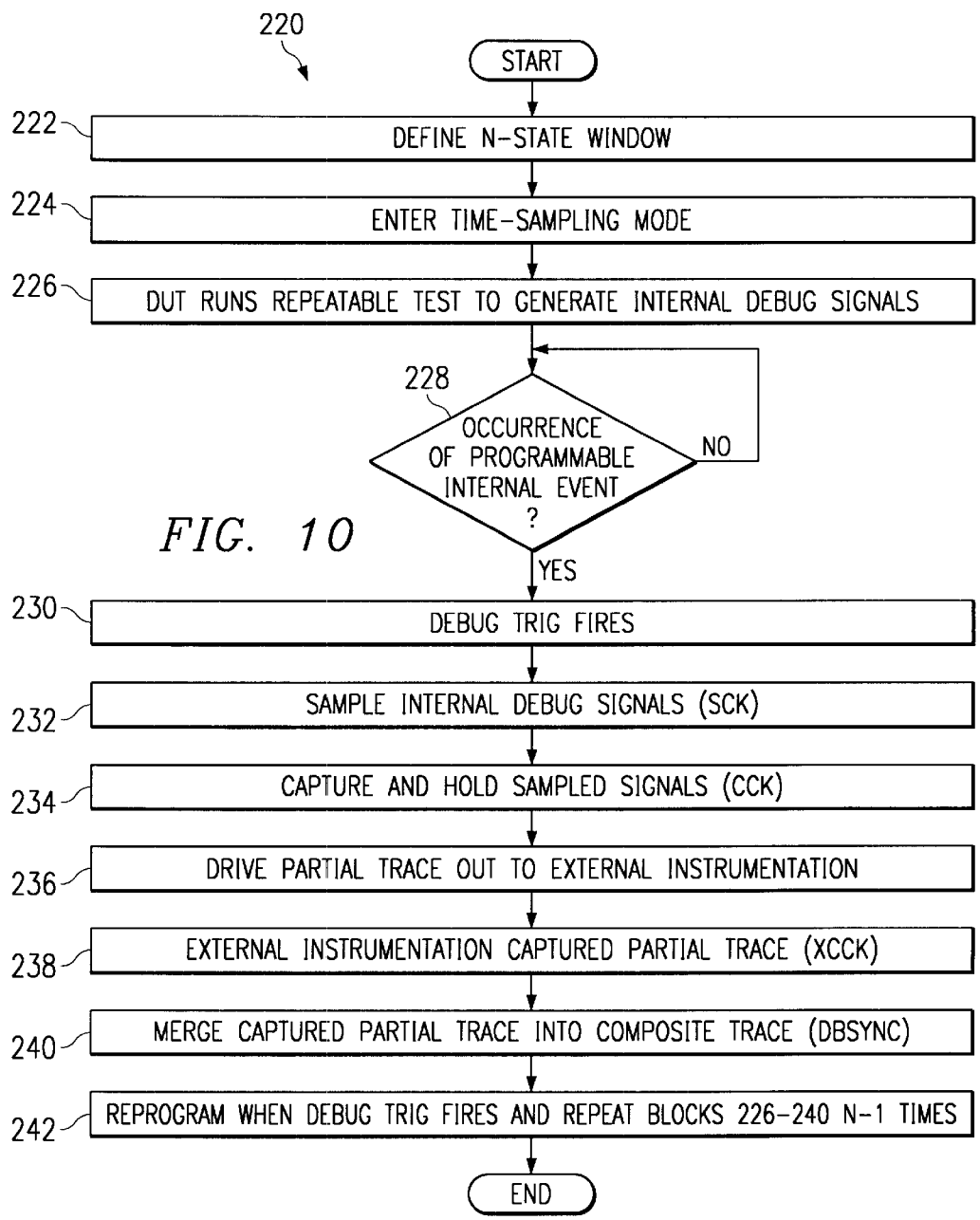
FIG. 10 is a flow chart that illustrates the methodology of the present invention.

The flow chart 220 of FIG. 10 illustrates the methodology of the present invention. The first step, illustrated at Block 222, is to define the N-state window of a repeatable test, where N is the number of states of the repeatable test which the DUT will be subjected to that are of interest. The repeatable test will be run N times in order to sample, capture (hold), and then drive out the N successive partial traces that will be merged by the external measurement instrumentation into the composite trace. At Block 224 the time-sampling mode is entered by appropriate exercise of Mode signal 24 shown in FIGS. 1, 4, 5 and 6. It is hereby noted that the order of Blocks 222 and 224 may be reversed so that the time-sampling mode of the DUT is entered prior to defining the N-state window. Or, the functionality represented by Blocks 222 and 224 may be performed concurrently.

Next, at Block 226 the repeatable test is run by the DUT to generate the programmable internal event that triggers Debug Trig 26 and the internal debug signals 12 that are to be sampled, captured, and driven out to the external measurement instrumentation as a partial trace. Upon detection of the occurrence of the programmable internal event, Decision Block 228 directs the flow to Block 230 in which Debug Trig 26 is asserted (fires) after some delay determined by programmable delay element 56 of FIG. 2 if applicable. The internal debug signals 12 are sampled at Block 232 in accordance with sample clock SCK 30 which is generated with respect to Debug Trig 26 in accordance with FIG. 4. At Block 234 capture clock circuitry 140 of FIG. 5 causes the sampled debug signals 12 to be captured and held in accordance with CCK 32. The sampled, captured, and held debug signals 12 of the partial trace are next driven out by DUT pad driver 18 to pad 20 at Block 236. At Block 238 the external measurement instrumentation can capture the partial trace in accordance with external capture clock XCCK signal 34 which is driven by pad driver 36 to pad 38. The thus-sampled-and-captured partial trace can be merged by external measurement instrumentation into the composite trace in accordance with DBSYNC signal 40 that is driven to DUT pad driver 42 to DUT pad 44. Finally, at Block 242, after Debug Trig is reprogrammed to fire at a different state within the N-state window (as shown at Block 230), the functionality outlined at Blocks 226–240 is repeated N–1 times to create the remaining partial traces required to create the composite trace of the defined N-state window. Simply put, the repeatable test must be repeated N–1 times after the first time the repeatable test is run, each time reprogramming Debug Trig signal 26 to fire a different state within the N-state window to be able to capture all states of internal signals 12 within the N-state window during subsequent test runs, so that the N states within the N-state window may be sampled, captured, and merged into the composite trace following successive runs of the repeatable test.

It is noted that the functionality of FIGS. 1, 8, 9, and 10 may be implemented by substituting software or firmware in the device under test and the external measurement instrumentation for the structure noted in FIGS. 4–7. This is particularly the case in which the device under test is a microprocessor which may be readily modified to include the necessary software/firmware to accomplish this functionality.

The time sampling of the present invention as described above is particularly useful for those applications in which the debug signals 12 of the DUT to be monitored and analyzed are much faster than the external measurement instrumentation. Considering the N=4 circuitry described above, for instance, internal signals of the DUT that are 400 MHz may be readily sampled, captured, driven out to single DUT pad 20 and analyzed by external measurement instrumentation, such as a logic analyzer, that is only capable of operating up to 100 MHz. The time sampling attributes of the present invention may likewise be used in those applications in which the DUT test is not repeatable. When the test is run the one time, successive states of the same signal are sampled, captured, and driven by multiple pad drivers out to corresponding multiple DUT pads. This approach requires that the DUT have N DUT pads, one for each of N successive states of the signal that is sampled, captured and driven when the non-repeatable test was run. For instance, if it is desired to sample, capture, and drive 10 successive states of one or more signals 12 during a test case, then the DUT must have 10 DUT pads for each signal and their supporting pad driver circuitry. Of course, a drawback with this approach is the increased pad count that is required.

The present invention may be applied beneficially for many different kinds of DUTs, and has particular benefit in a wide variety of different kinds of microprocessors. For purposes of illustration, the invention described above may be utilized with reference to a particular kind of microprocessor, namely a four-way super scalar reduced instruction set ("RISC") microprocessor. It is believed that this form of description will enable persons having ordinary skill in the art not only to make and use the invention, but also readily to perceive any modifications or adaptations necessary to apply the invention to microprocessors other than the one specifically described herein. This section will describe the illustrative host microprocessor first without having any of the components of the invention added to it.

Figure 11:
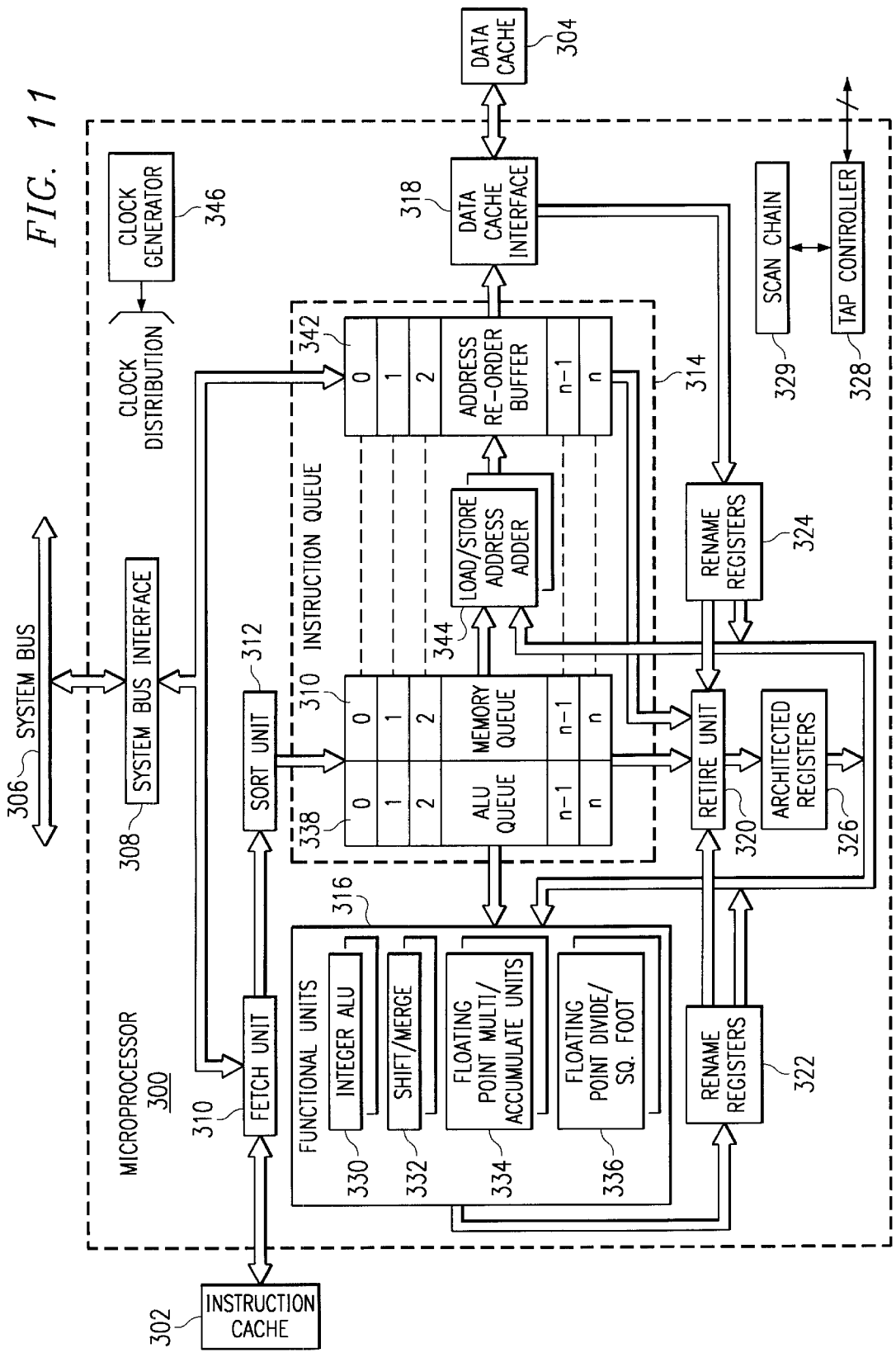
FIG. 11 is a block diagram illustrating a host four-way super scalar RISC microprocessor 300 coupled to an instruction cache, a data cache and a system bus.

FIG. 11 is a block diagram of an exemplary RISC microprocessor 300 before the addition of any of the components of the invention. The structure and functionality incorporated therein in the preceding drawings would be added to the DUT to which it is added, such as to the microprocessor(s) 300, 400 of FIGS. 11–12.

Microprocessor 300 is coupled to an instruction cache 302, a data cache 304 and a system bus 306. Microprocessor 300 includes system bus interface unit 308, instruction fetch unit 310, sort unit 312, instruction queue unit 314, functional units 316, data cache interface unit 318, retire unit 320, rename register blocks 322, 324, architected register block 326, test access port ("TAP") controller 328, scan chain 329 and clock generator 346. Functional units 316 include dual integer ALUs 330, dual shif/merge units 332, dual floating point multiply/accumulate units 334, and dual floating point divide/square root units 336. Instruction queue unit 314 includes ALU instruction queue 338, memory instruction queue 340, address reorder buffer 342, and dual load/store address adders 344.

System bus 306 is a multiplexed address/data split transaction bus that uses the same protocol as the system bus of the well-known PA-7200 microprocessor manufactured and sold by Hewlett Packard Company. System bus interface 308 is provided to implement the protocol necessary for microprocessor 300 to communicate with memory subsystem 408 and input/output subsystem 410 over system bus 306.

Instruction fetch unit 310 is provided to retrieve instructions from instruction cache 302 or, in the case of cache misses, from main memory subsystem 408. Cache lines can also be loaded into instruction queue 314 by sort unit 312 at the same rate as instruction fetch unit 310. When instruction fetch unit 310 indicates a cache miss, system bus interface 308 initiates instruction cache prefetches by fetching the next sequential line of instructions from main memory subsystem 408. High-bandwidth connections are provided both to instruction cache 302 and to data cache 304 to enhance performance. Data cache 304 is preferably dual-ported, with each port having access to a double word per cycle.

Once a group of instructions has been fetched, insertion of the instructions into instruction queue 314 is handled by sort unit 312. Specifically, sort unit 312 receives instructions from instruction fetch unit 310 and determines which of the instructions were actually requested by the CPU. This determination is called instruction validation. Sort unit 312 then routes the valid instructions to one or both of ALU queue 338 and memory queue 340. As was mentioned previously, queues 338 and 340 each have entries or "slots" for different instructions. Once a new instruction has been placed into a slot within one of the queues, hardware monitors the previous instructions that are then launching from the queues to functional units 316 and address adders 344. This is done in order to determine whether any of the now-launching instructions will supply an operand needed by the new instruction. Once the last instruction upon which the new instruction depends has been launched to functional units 316 or address adders 344, then the slot containing the new instruction begins to arbitrate for its own launch to functional units 316 or address adders 344.

Address reorder buffer 342 is provided to help eliminate performance penalties that are associated with load-store dependencies. When a load or store instruction in a slot of memory queue 340 has received all of its operands, it requests to be dispatched just like an ALU instruction. The destination of the load/store instruction, however, will be one of address adders 344 instead of one of functional units 316. Address adders 344 are provided so that the effective address for the load/store instruction may be calculated before executing the instruction. Once calculated, the effective address is stored into one of the slots within address reorder buffer 342. (Each of the slots within address reorder buffer 342 is associated with one of the slots in memory queue 340.) The effective address also goes to the translation look-aside buffer (not shown), which returns a physical address that is placed into the same slot of address reorder buffer 342. With its address stored in address reorder buffer 342, the load/store instruction begins arbitrating for access to one of the banks of synchronous SRAM that make up dual-ported data cache 304. The instruction tries again on each successive cycle until it wins access. (Arbitration is based on the age of the original load/store instruction, not the time its address has been in address reorder buffer 342. Priority is given to the oldest instruction.) Address reorder buffer 342 also checks for store-to-load dependencies.

Retire block 320 is provided to remove instructions from instruction queue 314 in program order after they have successfully executed or after their trap status is known. If an instruction needs to signal a trap, the trap parameters are recorded in the architected state, and the appropriate trap vector is forwarded to instruction fetch unit 310, which then begins fetching from the new address. Microprocessor 300 employs register renaming to execute (but not retire) instructions speculatively. At retire time, the contents of the rename register associated with a given instruction are committed to the appropriate architectural register, and any store data is forwarded to a buffer (not shown) that holds data to be written to data cache 304.

Test access port ("TAP") controller 328 is provided to implement a serial off-chip interface in accordance with the well-known Institute of Electrical and Electronics Engineers (IEEE) Standard 1149.1, "Test Access Port and Boundary Scan Architecture," also known as the Joint Test Action Group ("JTAG") standard. TAP controller 328 is coupled to numerous test nodes located adjacent to the chip pads of microprocessor 300. Such an arrangement of test nodes is commonly called a "scan chain," as is indicated in the drawing at 329. TAP controller 328 may be commanded to latch the state of the various test nodes constituting scan chain 329, and the data thus captured may then be shifted serially off-chip via the test access port for analysis by external equipment.

Figure 12:
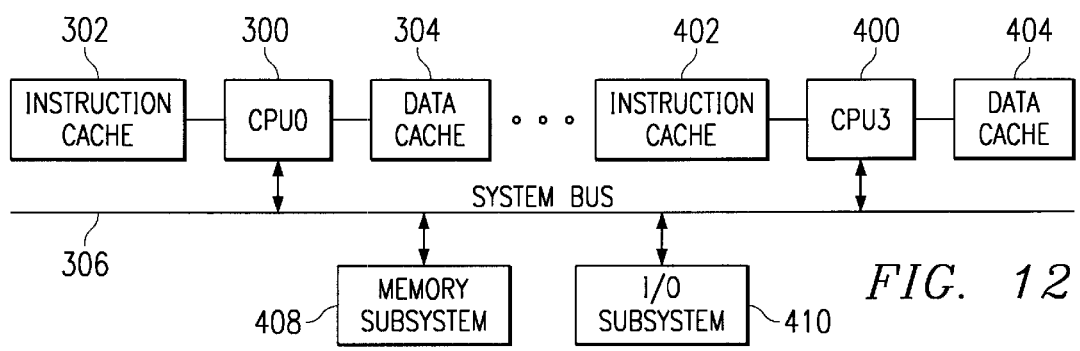
FIG. 12 is a block diagram illustrating a host multiprocessor computer system based on microprocessor 300.

As shown in FIG. 12, a complete computer system may be constructed using one or more microprocessors 300, 400 coupled via system bus 206 to a memory subsystem 408 and an input/output subsystem 410. In a multi-processor implementation such as that shown in FIG. 12, each of microprocessors 300, 400 would preferably have its own instruction cache 302, 402 and its own data cache 304, 404.

While the present invention has been described in detail in relation to a preferred embodiment thereof, the described embodiment has been presented by way of example and not by way of limitation. It will be understood by those skilled in the art that various changes may be made in the form and details of the described embodiment, resulting in equivalent embodiments that will remain within the scope of the appended claims.

What is claimed is:

1. A system that provides the capability to observe one or more internal signals of a device under test by a time-sampling mode in which N states of an N-state window are sampled and captured during N executions of a repeatable test to generate N partial traces that are driven out of the device under test and merged into a composite trace external to the device under test, wherein N is any desired number, wherein N is any desired number, said system comprising:

a control path that receives a clock signal of the device under test, a mode control signal, and a trigger signal, generates a sample clock, a capture clock, an external capture clock, and a synchronization control signal, and drives the synchronization control signal to a first observation element of the control path and the external capture clock to a second observation element of the control path, wherein when the trigger signal will assert and then de-assert after the occurrence of a programmable internal event of the device under test is programmable; and a data path that receives one or more internal signals of the device under test, samples a state of the one or more internal signals as controlled to by the sample clock generated by the control path to generate a partial trace of the N partial traces, captures and holds the partial trace as controlled by the capture clock generated by the control path, and drives the partial trace to a third observation element of the data path.

2. The system of claim 1, wherein said control path further comprises a timing control block having:

a sample clock generation element that is provided with the clock signal, the trigger signal and the mode control signal as input signals, wherein when the mode control signal is a first logic level the sample clock generation element operates in a normal mode and generates the sample clock every cycle of the clock signal and when the mode control signal is a second logic level the sample clock generation element operates in a time sampling mode and generates the sample clock once every N cycles of the clock signal;

an external capture clock generation element that receives the mode control signal and is controlled by the mode control signal to generate the external capture clock; and a synchronization control signal generation element that receives the trigger signal and a sample signal that is a first valid sample of the one or more internal signals after the trigger signal asserts and de-asserts following the occurrence of the programmable internal event as input signals and generates the synchronization control signal that fires only upon the first valid sample of the one or more internal signals;

and wherein said data path further comprises:

a sampler element of the device under test that receives the one or more internal signals of the device under test that are generated by the device under test executing the repeatable test and the sample clock generated by the timing control block, wherein the sample clock causes the sampler element to sample a state of the one or more internal signals within the N-state window during execution of the repeatable test to generate a partial trace of the N partial traces and wherein the state of the one or more internal signals that is sampled by the sampler element is defined by when the trigger signal is programmed to assert and de-assert following the occurrence of the programmable internal event.

3. The system of claim 2, wherein the control path further comprises:

a first driver element of the device under test that drives the synchronization control signal to the first observation element; and a second driver element of the device under test that drives the external capture clock to the second observation element;

wherein the data path further comprises:

a third driver element of the device under test that drives the partial trace to the third observation element.

4. The system of claim 2, wherein said control path further comprises:

a capture clock generation element that is provided with the mode control signal and the clock signal as input signals, wherein when the mode control signal is the first logic level the capture clock generation element generates the capture clock every cycle of the clock signal and when the mode control signal is the second logic level the capture clock generation element generates the capture clock once every N cycles of the clock signal, and wherein said data path further comprises:

a synchronizer element of the device under test that receives the partial trace generated by the sampler element and the capture clock generated by the capture clock generation element, and that captures the partial trace in accordance with the capture clock and then outputs the partial trace after a predetermined period of time.

5. The system of claim 2, wherein the synchronization control signal generation element introduces a delay into the trigger signal to generate a delayed trigger signal and gates the delayed trigger signal and the sample signal to generate the synchronization control signal.

6. The system of claim 1, wherein the control path further comprises:
a first driver element of the device under test that drives the synchronization control signal to the first observation element; and
a second driver element of the device under test that drives the external capture clock to the second observation element;
wherein the data path further comprises:
a third driver element of the device under test that drives the partial trace to the third observation element.

7. The system of claim 1, further comprising:
an instrumentation element external to the device under test that receives the partial trace on the first observation element, the external capture clock on the second observation element, and the synchronization control signal on the third observation element, wherein the external capture clock controls when the instrumentation element captures the partial trace on the first observation element of the device under test and wherein the synchronization control signal controls the instrumentation element to merge the partial trace into a composite trace.

8. The system of claim 7, wherein when the mode control signal is the second logic level the external capture clock is used by the instrumentation element to capture the partial trace on the third observation element.

9. A system that provides the capability to observe one or more internal signals of a device under test by a time-sampling mode in which N states of an N-state window are sampled and captured during N executions of a repeatable test to generate N partial traces that are driven out of the device under test and merged into a composite trace external to the device under test, wherein N is any desired number, said system comprising:
a timing control block of the device under test that receives a clock signal of the device under test, a mode control signal, and a trigger signal and that generates a sample clock, a capture clock, an external capture clock, and a synchronization control signal, wherein when the trigger signal will assert and then de-assert after the occurrence of a programmable internal event is programmable, said timing control block further comprising:
a sample clock generation element that is provided with the clock signal, the trigger signal and the mode control signal as input signals, wherein when the mode control signal is a first logic level the sample clock generation element operates in a normal mode and generates the sample clock every cycle of the clock signal and when the mode control signal is a second logic level the sample clock generation element operates in a time-sampling mode and generates the sample clock only once every N cycles of the clock signal;
an external capture clock generation element that receives the mode control signal and is controlled by the mode control signal to generate the external capture clock; and
a synchronization control signal generation element that receives the trigger signal and a sample signal that is a first valid sample of the one or more internal signals after the trigger signal asserts and de-asserts following the occurrence of the programmable internal event as input signals and generates the synchronization control signal that fires only upon the first valid sample of the one or more internal signals;
a sampler element of the device under test that receives the one or more internal signals of the device under test that are generated by the device under test executing the repeatable test and the sample clock generated by the timing control block, wherein the sample clock causes the sampler element to sample a state of the one or more internal signals within the N-state window during execution of the repeatable test to generate a partial trace of the N partial traces that is merged into the composite trace as controlled by the synchronization control signal and wherein the state of the one or more internal signals that is sampled by the sampler element is defined by when the trigger signal is programmed to assert and de-assert following the occurrence of the programmable internal event;
a first driver element of the device under test;
a first observation element of the device under test, wherein the first driver element receives the partial trace from the synchronizer element and drives the partial trace to the first observation element, wherein the external capture clock controls when the partial trace on the first observation element is captured;
a second driver element of the device under test;
a second observation element of the device under test, wherein the second driver element receives the external capture clock from the timing control block and drives the external capture clock to the second observation element;
a third driver element of the device under test; and
a third observation element of the device under test, wherein the third driver element receives the synchronization control signal from the timing control block and drives the synchronization control signal to the third driver element.

10. The system of claim 9, further comprising:
a capture clock generation element that is provided with the mode control signal and the clock signal as input signals, wherein when the mode control signal is the first logic level the capture clock generation element generates the capture clock every cycle of the clock signal and when the mode control signal is the second logic level the capture clock generation element generates the capture clock every N cycles of the clock signal, and
a synchronizer element of the device under test that receives the partial trace generated by the sampler element and the capture clock generated by the capture clock generation element, and that captures the partial trace in accordance with the capture clock and then outputs the partial trace after a predetermined period of time.

11. The system of claim 9, wherein the synchronization control signal generation element introduces a delay into the trigger signal to generate a delayed trigger signal and gates the delayed trigger signal and the sample signal to generate the synchronization control signal.

12. The system of claim 9, further comprising:
an instrumentation element external to the device under test that receives the partial trace on the first observation element, the external capture clock on the second observation element, and the synchronization control signal on the third observation element, wherein the external capture clock controls when the instrumentation element captures the partial trace on the first observation element of the device under test and wherein the synchronization control signal controls the instrumentation element to merge the partial trace into a composite trace.

13. The system of claim 12, wherein when the mode control signal is the second logic level the external capture clock is used by the instrumentation element to capture the partial trace on the first observation element.

14. Timing control circuitry of a device under test that provides the timing control necessary for observation of one or more internal signals of the device under test by entering a time-sampling mode in which N states of an N-state window are sampled and captured during N executions of a repeatable test to generate N partial traces that are driven out of the device under test and merged into a composite trace external to the device under test, wherein N is any desirednumber, said timing control circuitry comprising:

a sample clock generation element that is provided with a clock signal, a trigger signal and a mode control signal as input signals, wherein when the mode control signal is a first logic level the sample clock generation element operates in a normal mode and generates a sample clock every cycle of the clock signal and when the mode control signal, is a second logic level the sample clock generation element operates in a time-sampling mode and generates the sample clock only once every N cycles of the clock signal, wherein when the trigger signal will assert and then de-assert after the occurrence of the programmable internal event is programmable and wherein the sample clock controls when the one or more internal signals of the device under test will be sampled to create a partial trace of the N traces;

an external capture clock generation element that receives the mode control signal and is controlled by the mode control signal to generate an external capture clock that controls when the partial trace is captured by an instrumentation external to the device under test; and a synchronization control signal generation element that receives the trigger signal and a sample signal that is a first valid sample of the one or more internal signals after the trigger signal asserts and de-asserts following the occurrence of the programmable internal event as input signals and generates the synchronization control signal that fires only upon the first valid sample of the one or more internal signals and that is used by the instrumentation to merge the partial trace into the composite trace.

15. The circuitry of claim 14, further comprising:

a capture clock generation element that is provided with the mode control signal and the clock signal as input signals, wherein when the mode control signal is the first logic level the capture clock generation element generates the capture clock every cycle of the clock signal and when the mode control signal is the second logic level the capture clock generation element generates the capture clock every N cycles of the clock signal, and a synchronizer element of the device under test that receives the partial trace generated by the sampler element and the capture clock generated by the capture clock generation element, and that captures the partial trace in accordance with the capture clock and then outputs the partial trace after a predetermined period of time.

16. The circuitry of claim 14, wherein the synchronization control signal generation element introduces a delay into the trigger signal to generate a delayed trigger signal and gates the delayed trigger signal and the sample signal to generate the synchronization control signal.

17. A method for observing one or more internal signals of a device under test by time-sampling in which N states of an N-state window are sampled and captured during N executions of a repeatable test to generate N partial traces that are driven out of the device under test and merged into a composite trace external to the device under test, wherein N is any desired number, said method comprising:

a) defining a N-state window of the one or more internal signals;

b) entering a time-sampling mode of the device under test in which a sample clock of the device under test is generated-once every N cycles of a clock of the device under test;

c) the device under test executing a repeatable test to generate the one or more internal signals;

d) if the occurrence of a programmable internal event is detected, asserting a trigger signal of the device under test to a first logic level to halt generation of the sample clock once every N cycles of the clock;

e) de-asserting the trigger signal to a second logic level to resume generation of-the sample clock once every N cycles of the clock, wherein when the trigger signal is asserted and then de-asserted, after the occurrence of the programmable internal event, is programmable;

f) sampling a state of the one or more internal signals within the N-state window in accordance with the sample clock is asserted to generate a partial trace, wherein the state of the one or more internal signals that is sampled is determined by when the trigger signal is programmed to assert and then de-assert after the occurrence of the programmable internal event; and g) driving the partial trace out to a first observation pad of the device under test.

18. The method of claim 17, said method further comprising:

h) capturing the partial trace on the first observation pad in accordance with an external capture clock driven to a second observation pad of the device under test; and i) merging the partial trace into the composite trace in accordance with a synchronization control signal driven to a third observation pad of the device under test.

19. The method of claim 18, wherein step h) is performed by an instrumentation external to the device under test that captures the external capture clock driven to the second observation pad and captures the partial trace on the first observation pad in accordance with the external capture clock and wherein step i) is performed by the instrumentation that captures the synchronization control signal driven to the third observation pad and merges the partial trace into the composite trace in accordance with the synchronization control signal.

20. The method of claim 18, further comprising:

j) reprogramming when the trigger signal will assert and then de-assert to define another state to sample within the N-state window and repeating steps c) through j) for each state within the N-state window to generate the composite trace.

21. The method of claim 17, further comprising:

h) reprogramming when the trigger signal will assert and then de-assert to define another state to sample within the N-state window and repeating steps c) through g)

for each state within the N-state window to generate the composite trace.

22. The method of claim 17, wherein after sampling the state of the one or more internal signals and prior to driving the partial trace out to the first observation pad, further comprising:
capturing and holding the partial trace when a capture clock of the device under test is asserted to the first logic level.

23. The method of claim 17, wherein the order in which steps a) and b) are performed is reversed.

24. A computer-readable medium having a computer program for observing one or more internal signals of a device under test by time-sampling in which N states of an N-state window are sampled and captured during N executions of a repeatable test to generate N partial traces that are driven out of the device under test and merged into a composite trace external to the device under test, wherein N is any desired number, said computer program comprising:
   a) instructions for defining a N-state window of the one or more internal signals,
   b) instructions for entering a time-sampling mode of the device under test in which a sample clock of the device under test is generated once every N cycles of a clock of the device under test;
   c) instructions for the device under test executing a repeatable test to generate the one or more internal signals;
   d) if the occurrence of a programmable internal event is detected, instructions for asserting a trigger signal of the device under test to a first logic level to halt generation of the sample clock once every N cycles of the clock;
   e) instructions for de-asserting the trigger signal to a second logic level to resume generation of the sample clock once every N cycles of the clock, wherein when the trigger signal is asserted and then de-asserted, after the occurrence of the programmable internal event, is programmable;
   f) instructions for sampling a state of the one or more internal signals within the N-state window in accordance with the sample clock is asserted to generate a partial trace, wherein the state of the one or more internal signals that is sampled is determined by when the trigger signal is programmed to assert and then de-assert after the occurrence of the programmable internal event; and
   g) instructions for driving the partial trace out to a first observation pad of the device under test.

25. The medium of claim 24, further comprising:
   h) instructions for capturing the partial trace on the first observation pad in accordance with an external capture clock driven to a second observation pad of the device under test; and
   i) instructions for merging the partial trace into the composite trace in accordance with a synchronization control signal driven to a third observation pad of the device under test.

26. The medium of claim 25, wherein the instructions of h) are performed by an instrumentation external to the device under test that captures the external capture clock driven to the second observation pad and captures the partial trace on the first observation pad in accordance with the external capture clock and wherein the instructions of i) are performed by the instrumentation external to the device under test that captures the synchronization control signal driven to the third observation pad and merges the partial trace into the composite trace in accordance with the synchronization control signal.

27. The medium of claim 25, further comprising:
   j) Instructions for reprogramming when the trigger signal will assert and then de-assert to define another state to sample within the N-state window and repeating instructions c) through j) for each state within the N-state window to generate the composite trace.

28. The medium of claim 24, further comprising:
   h) instructions for reprogramming when the trigger signal will assert and then de-assert to define another state to sample within the N-state window and repeating instructions c) through g) for each state within the N-state window to generate the composite trace.

29. The medium of claim 24, wherein after sampling the state of the one or more internal signals and prior to driving the partial trace out to the first observation pad, further comprising:
instructions for capturing and holding the partial trace when a capture clock of the device under test is asserted to the first logic level.

30. The medium of claim 24, wherein the order in which instructions a) and b) are performed is reversed.

* * * * *

UNITED STATES PATENT AND TRADEMARK OFFICE
CERTIFICATE OF CORRECTION

PATENT NO.    : 6,397,354 B1
DATED         : May 28, 2002
INVENTOR(S)   : Oguz Ertekin It is certified that error appears in the above-identified patent and that said Letters Patent is hereby corrected as shown below:

Column 15,
Line 34, after "generate" delete "."

Signed and Sealed this

Fifth Day of October, 2004

JON W. DUDAS
*Director of the United States Patent and Trademark Office*